(12) United States Patent  
Wilkens et al.

(10) Patent No.: US 9,308,954 B2
(45) Date of Patent: Apr. 12, 2016

(54) DOOR ADJUSTMENT TOOL (71) Applicants: Jonathan F. Wilkens, Seattle, WA (US); Mathew J. Freiheit, San Jose, CA (US)

(72) Inventors: Jonathan F. Wilkens, Seattle, WA (US); Mathew J. Freiheit, San Jose, CA (US)

(73) Assignee: PACCAR Inc, Bellevue, WA (US)

( * ) Notice: Subject to any disclaimer, the term of this patent is extended or adjusted under 35 U.S.C. 154(b) by 433 days.

(21) Appl. No.: 13/738,818

(22) Filed: Jan. 10, 2013

(65) Prior Publication Data

US 2014/0189996 A1 Jul. 10, 2014

(51) Int. Cl.
*B62D 65/06* (2006.01)
*B62D 65/02* (2006.01)

(52) U.S. Cl.
CPC .............. *B62D 65/06* (2013.01); *B62D 65/026* (2013.01); *Y10T 29/49895* (2015.01); *Y10T 29/53983* (2015.01)

(58) Field of Classification Search
CPC ........ B25B 27/14; B25B 27/16; B25B 31/00; B25B 27/00
See application file for complete search history.

(56) References Cited

U.S. PATENT DOCUMENTS

| | | | |
|---|---|---|---|
| 4,861,099 A | 8/1989 | Sasamura | |
| 7,934,711 B2 * | 5/2011 | Wong | 269/45 |
| 7,938,458 B1 | 5/2011 | Zweibohmer | |
| 2010/0237210 A1 * | 9/2010 | Anderson et al. | 248/274.1 |
| 2011/0197411 A1 * | 8/2011 | Huang | 29/271 |
| 2014/0189996 A1 * | 7/2014 | Wilkens et al. | 29/464 |
| 2015/0000458 A1 * | 1/2015 | Ganguly et al. | 74/512 |

* cited by examiner

*Primary Examiner* — Lee D Wilson
(74) *Attorney, Agent, or Firm* — Christensen O'Connor Johnson Kindness PLLC (57) ABSTRACT

An alignment tool for use with a vehicle having a door moveably secured to a door frame and a door latch assembly defined on the door includes a body having a front surface and a rear surface and a through-hole extending through the body that is sized and configured to receive a striker pin of a vehicle. A first end surface defined on the body is configured to engage the door frame to set a cross-car position of the striker pin. A latch-engaging assembly is engageable with a portion of the door latch assembly to set a vertical position of the striker pin.

19 Claims, 14 Drawing Sheets

DOOR ADJUSTMENT TOOL

BACKGROUND

When assembling the vehicle, the doors of the vehicle must be accurately positioned relative to the vehicle cab opening to properly seal the door against the door seal within the door opening and to properly position the door relative to the door latch assembly for secure closure. A typical door latch assembly includes a striker pin attached to and extending perpendicularly from a door frame on the vehicle cab near the opening. The door latch assembly further includes a latch on the edge of the door that is configured to engage the striker pin for securing the door in the closed position. If the striker pin is not accurately positioned on the door frame, the door may not properly close or seal within the opening when the striker pin engages the latch.

In a typical installation of a door assembly, the striker pin is secured on the door frame assembly and thereafter engaged with the latch. If the installer determines that the striker pin does not properly engage the latch, the striker pin must be repositioned on the door frame in the vertical, fore/aft, and/or cross car direction and tested again. Such a "guess and check" method of installation is time consuming, labor intensive, and unreliable.

Moreover, when the door is not sealed properly against the door seal, it will lead to air and water leaks around the door opening. Furthermore, if the striker pin is not accurately positioned relative to the latch, the door may not close properly, endangering the driver or passengers.

Thus, it is desired to provide a device and method for installing a door assembly on a vehicle.

SUMMARY

An alignment tool for use with a vehicle having a door moveably secured to a door frame and a door latch assembly defined on the door includes a body having a front surface and a rear surface and a through-hole extending through the body that is sized and configured to receive a striker pin of a vehicle. A first end surface defined on the body is configured to engage the door frame to set a cross-car position of the striker pin. A latch-engaging assembly is engageable with a portion of the door latch assembly to set a vertical position of the striker pin.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
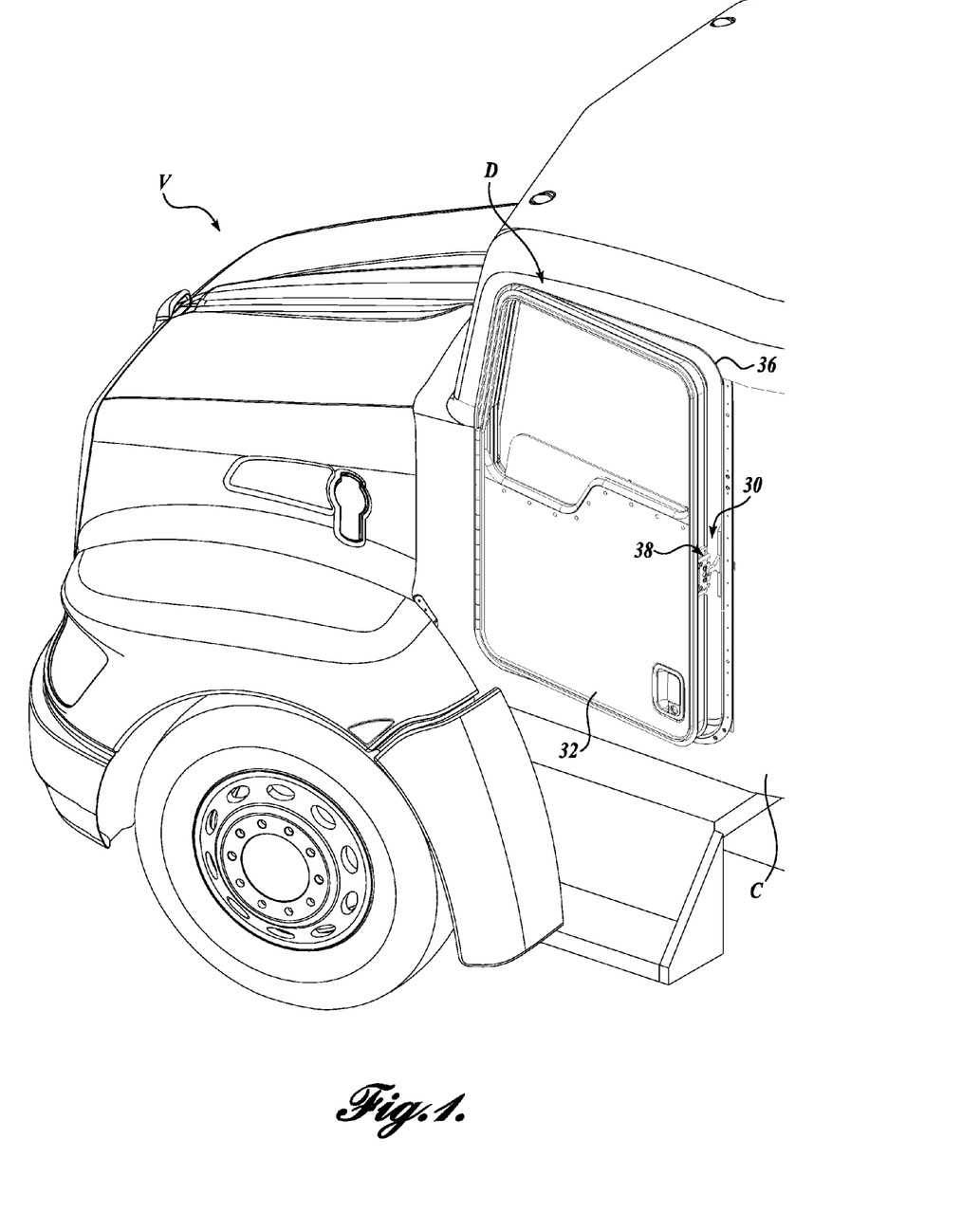
FIG. 1 is an environmental view of an alignment tool formed in accordance with a first embodiment of the present disclosure, wherein the alignment tool is shown in use with a vehicle having a door.
Figure 2:
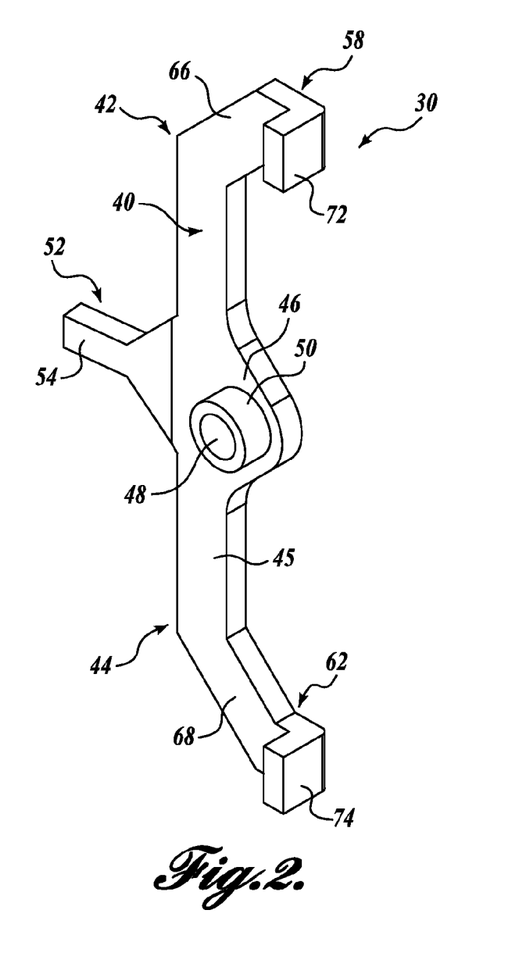
FIG. 2 is an isometric front view of the alignment tool of FIG. 1.
Figure 3:
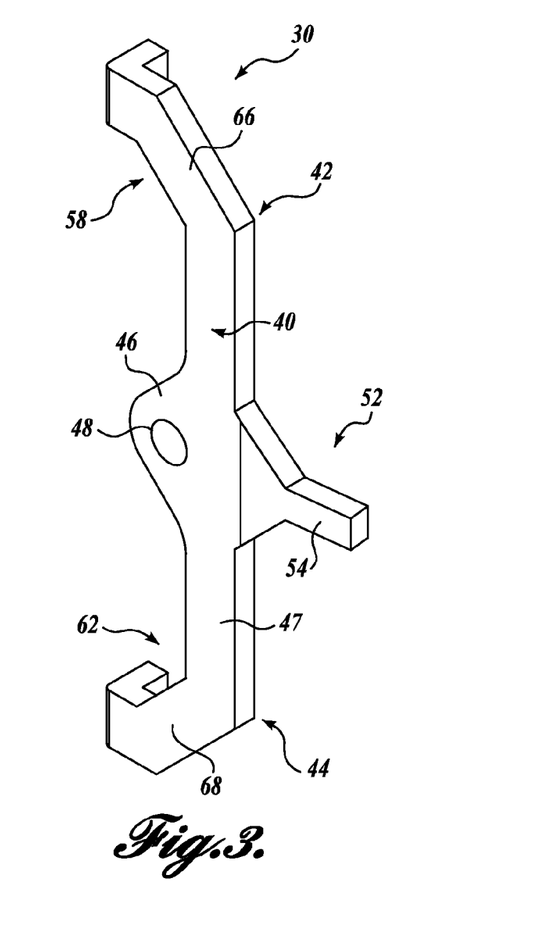
FIG. 3 is an isometric rear view of the alignment tool of FIG. 1.
Figure 4:
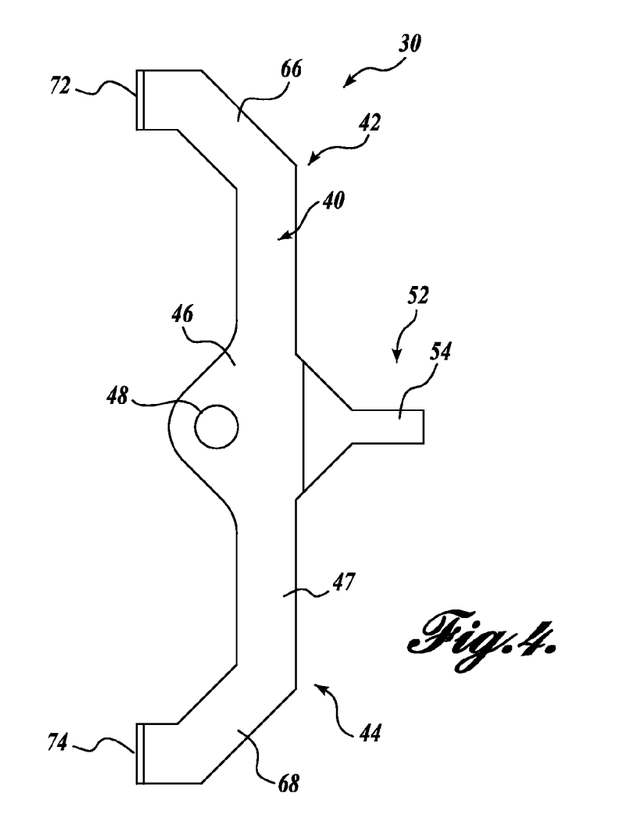
FIG. 4 is a rear plan view of the alignment tool of FIG. 1.
Figure 5:
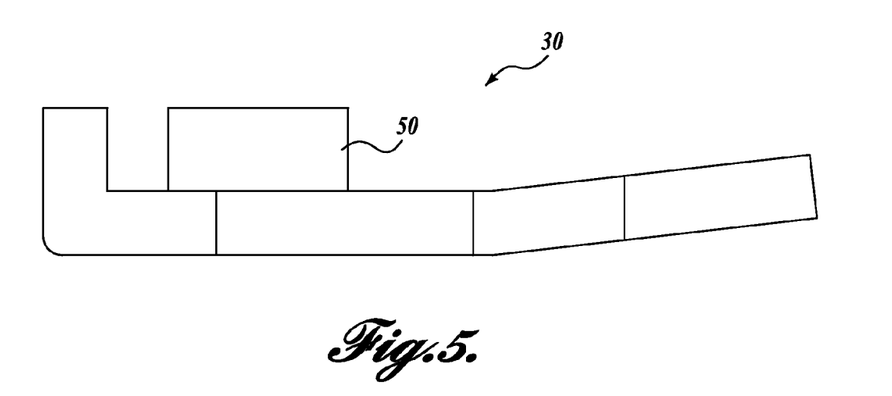
FIG. 5 is a side plan view of the alignment tool of FIG. 1.

An alignment tool 30 formed in accordance with a first embodiment of the present disclosure may best be seen by referring to FIG. 1. The alignment tool 30 is configured for use in installation of a door assembly D within a cab C of a vehicle V. The door assembly D includes a door 32 securable within a door opening 36. A striker pin (not shown in FIG. 1) extending from a door frame is engageable with a latch assembly 38 on the door 32. The alignment tool 30 is used to properly position the striker pin relative to the latch assembly 38 to align and seal the door 32 within the door opening 36.

Although the alignment tool 30 is shown in use with a vehicle V, such as a class 8 truck, it should be appreciated that the alignment tool 30 may be used with any suitable vehicle or door assembly. Thus, the description and illustrations provided herein should not be construed as limiting the scope of the claimed subject matter.

Moreover, throughout the disclosure, certain directional terms, such as fore/aft, cross-car, vertical, front, rear, etc., will be used to described aspects of the alignment tool 30 and the door assembly D of the vehicle V. For instance, the directional term "fore/aft" may be used to describe features of the alignment tool 30 extending in the fore or aft directions when positioned relative to a vehicle. Similarly, the directional term "cross-car" may be used to describe features of the alignment tool 30 extending across the vehicle when positioned relative to a vehicle. It should be appreciated that such directional terms are for illustrative purposes only and are not intended to limit the scope of the claimed subject matter.

Referring to FIGS. 2-5, the alignment tool 30 will now be described in further detail. The alignment tool 30 includes an elongated body 40 having a first end 42, a second end 44 opposite the first end 42, a front surface 45, and a rear surface 47 opposite the front surface 45. A striker pin protrusion 46 extends laterally from a first side of the longitudinal body 40 near the center of the longitudinal body 40. A striker pin through-hole 48 extends substantially transversely through the striker pin protrusion 46 (through the front and rear surfaces 45 and 47 of the alignment tool 30) that is sized and configured to receive a striker pin 82 therein (see FIGS. 6 and 7). The striker pin through-hole 48 is surrounded by an annular collar 50 extending substantially transversely from the front surface 45 of the alignment tool 30. When the rear surface 47 of the alignment tool 30 is positioned against a cross-car door frame member 84 of a door frame 78, the head of the striker pin 82 may be positioned substantially flush within the annular collar 50 to set the fore/aft position of the striker pin 82 relative to the door frame 78.

The alignment tool 30 further includes a latch-engaging assembly 52 that sets the vertical position of the striker pin 82 and temporarily secures the door 32 in an open position during installation of the striker pin 82. The latch-engaging assembly 52 includes an elongated latch fork-engaging member 54 that extends laterally from a second, opposite side of the longitudinal body 40 near the center of the longitudinal body 40. The latch fork engaging member 54 has a longitudinal axis that is in substantial alignment with the center of the striker pin through-hole 48. The latch fork-engaging member 54 is sized and configured to engage a standard pivotal latch fork 56 of a door latch assembly 38. (See FIGS. 6-8).

Although the alignment tool 30 may be configured for use with any suitable latch assembly, the depicted latch assembly 38 includes a standard latch fork 56 pivotally disposed within a mounting ear bracket assembly 60 secured to an interior edge of the door 32. When the latch fork-engaging member 54 engages the latch fork 56, the alignment tool 30 sets the vertical position of the striker pin 82 in relation to the latch assembly 38. Fine tune adjustments of the vertical position may be made by imposing a vertical force (such as with a hammer) on one of the first or second cross-car location members 58 and 62.

The latch fork-engaging member 54 is also configured to engage the latch assembly 38 and temporarily secure the door 32 in an open position during the positioning and installation of the striker pin 82. In that regard, the latch-engaging assembly 52 is suitably contoured, bent, etc., to appropriately engage the latch assembly 38 without interfering with the door 32 or the door frame 78. For instance, as can be seen by referring to FIG. 5, the latch-engaging assembly 52 is not co-planar with the body 40 of the alignment tool 30. Rather, the latch-engaging assembly 52 extends from the body 40 of the alignment tool 30 at an angle to suitably engage the latch assembly 38.

The alignment tool 30 further includes first and second cross-car location members 58 and 62 configured to engage a portion of the door frame 78 to set the cross-car location of the striker pin 82. The first cross-car location member 58 includes a first diagonal member 66 extending from the first end of the longitudinal body 40 that terminates in a first substantially flat door frame engaging surface 72. Similarly, the second cross-car location member 62 includes a second diagonal member 68 extending from the second end of the longitudinal body 40 that terminates in a second substantially flat door frame engaging surface 74. The first and second substantially flat door frame engaging surfaces 72 and 74 are substantially coplanar to define an end surface of the body 40.

Figure 6:
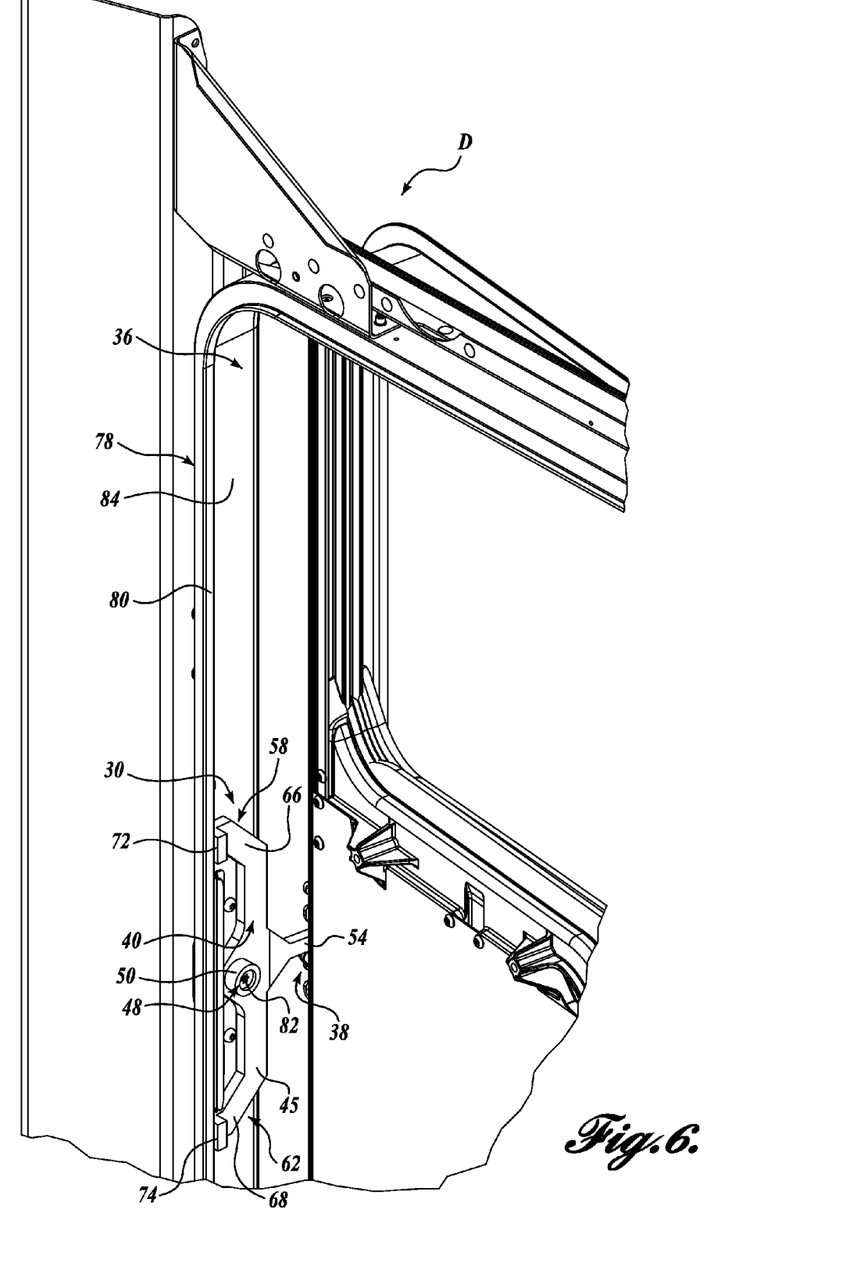
FIG. 6 is a front isometric view of the alignment tool of FIG. 1 shown in use with a door assembly.
Figure 7:
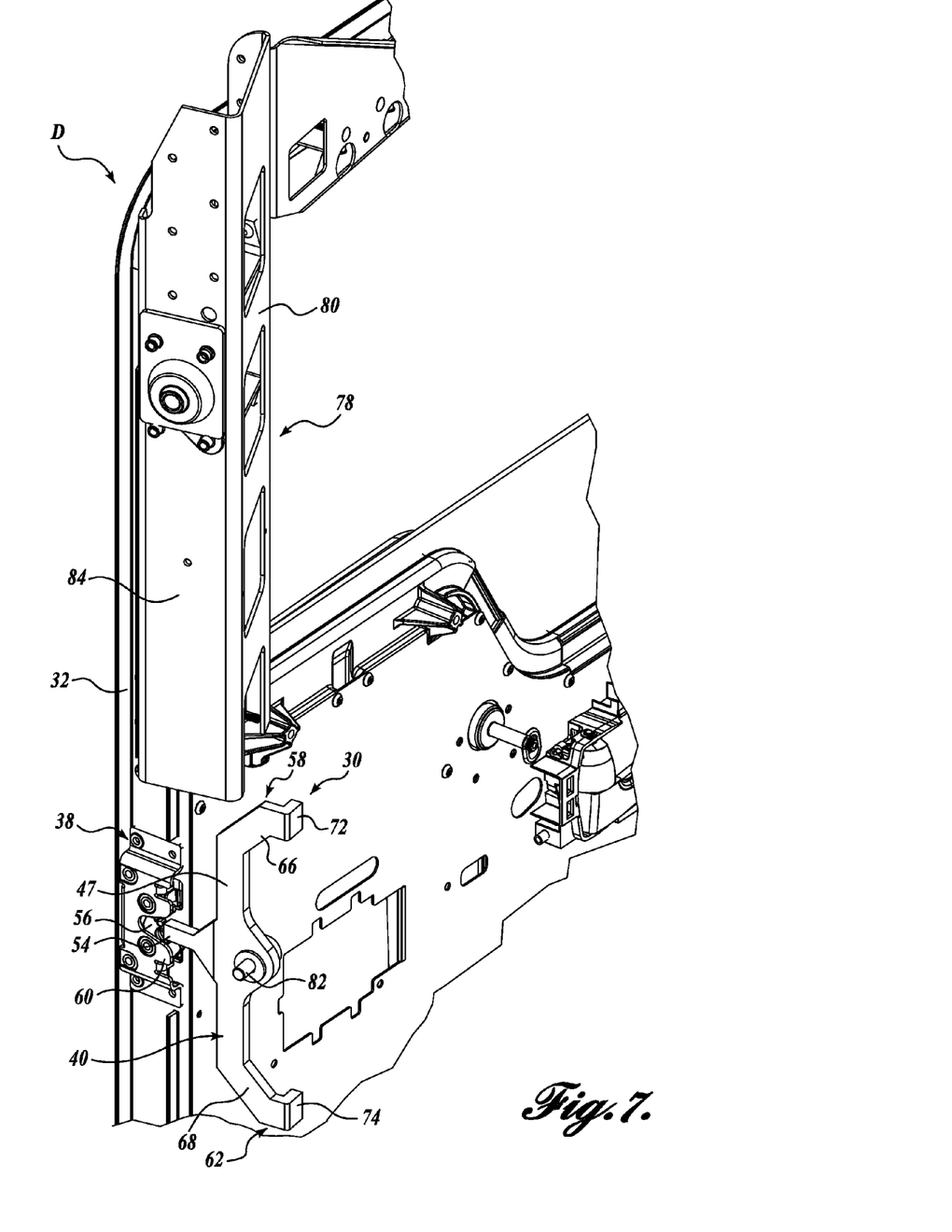
FIG. 7 is a rear isometric view of the alignment tool of FIG. 1 shown in use with a door assembly.
Figure 8:
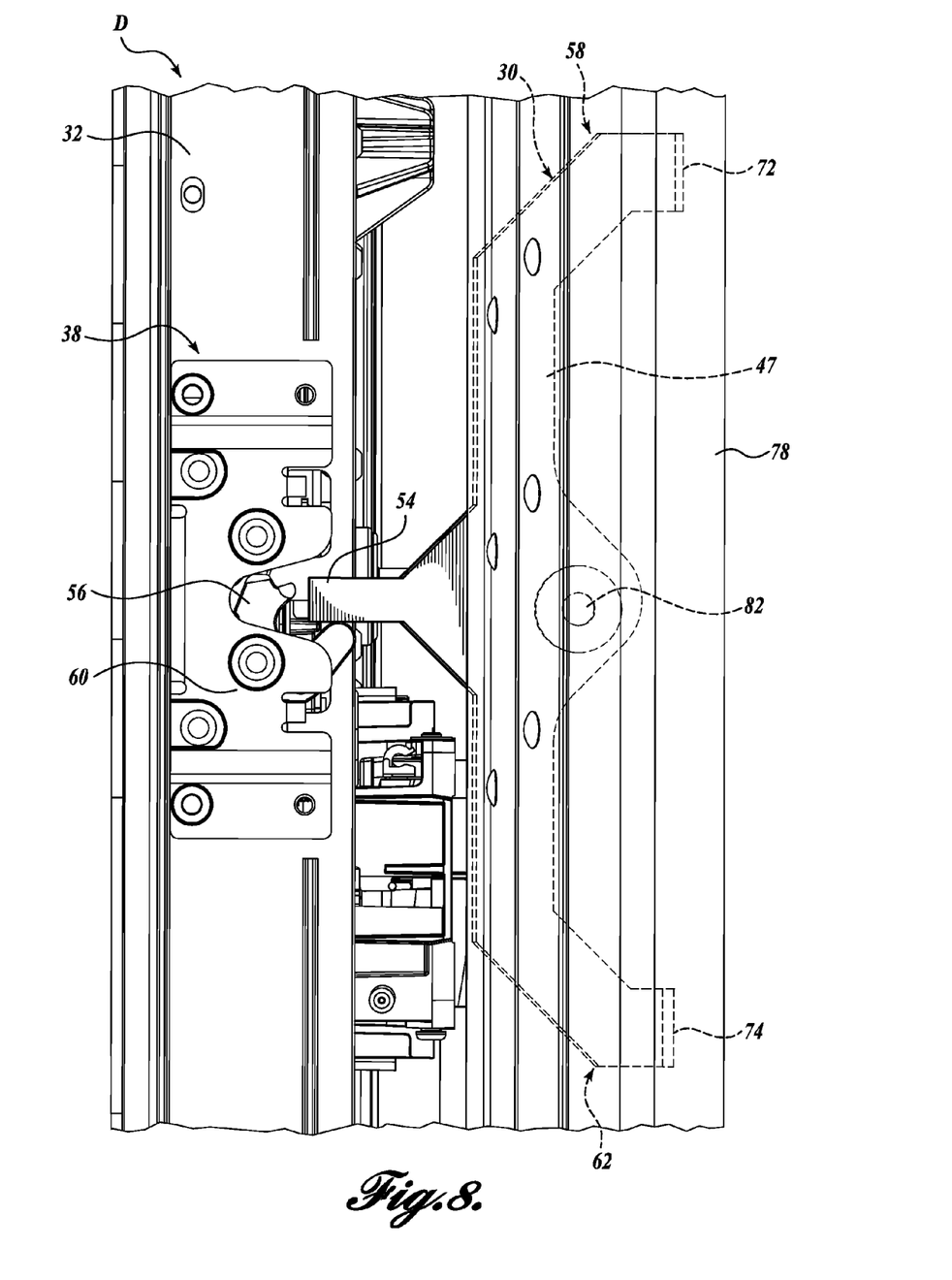
FIG. 8 is a rear plan view of the alignment tool of FIG. 1 shown in use with a door latch assembly of a door assembly.
Figure 9:
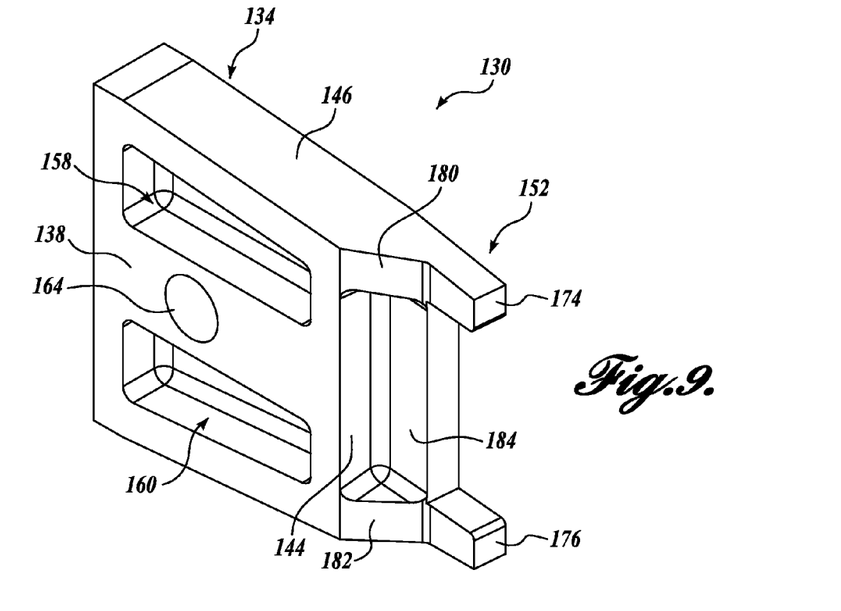
FIG. 9 is an isometric front view of an alignment tool formed in accordance with a second embodiment of the present disclosure.
Figure 10:
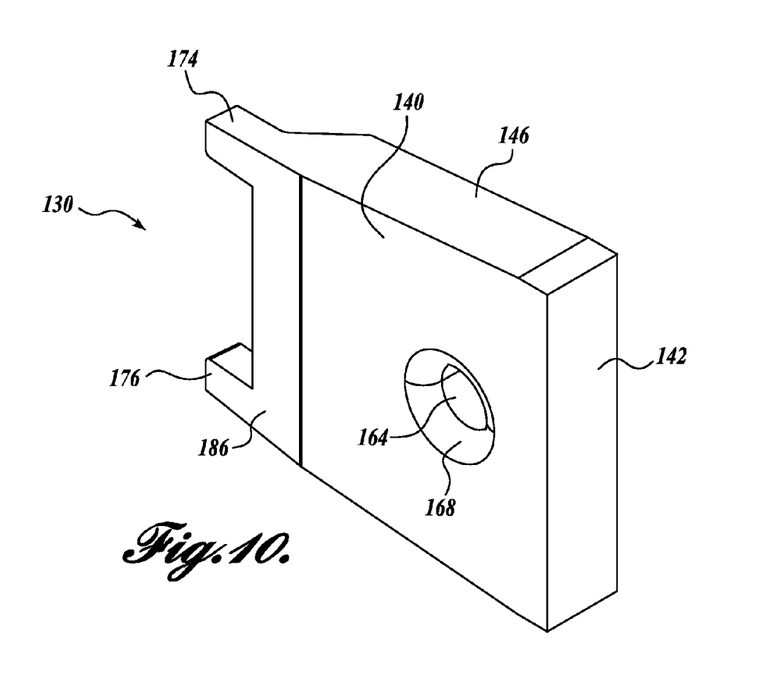
FIG. 10 is an isometric rear view of the alignment tool of FIG. 9.
Figure 11:
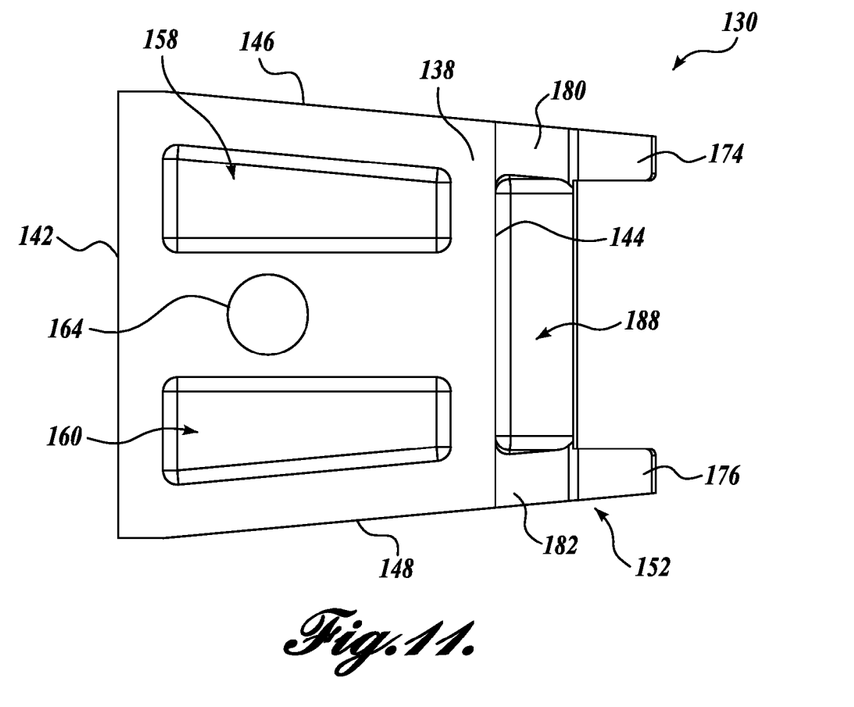
FIG. 11 is a front plan view of the alignment tool of FIG. 9.
Figure 12:
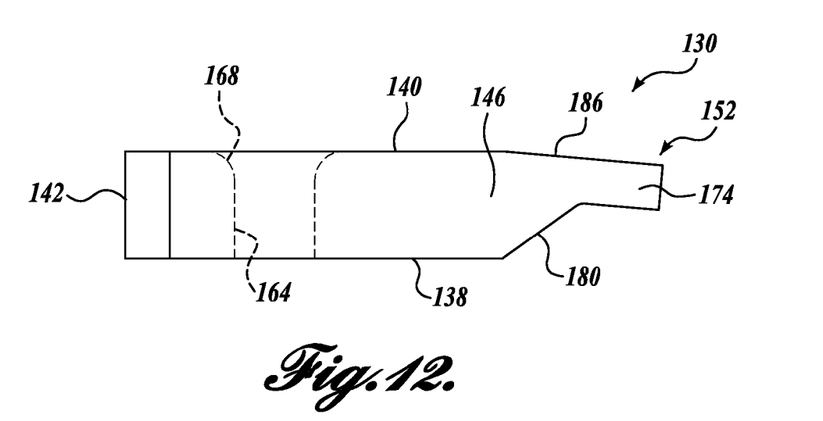
FIG. 12 is a side plan view of the alignment tool of FIG. 9.

Referring additionally to FIGS. 6-8, the first and second substantially flat door frame engaging surfaces 72 and 74 are configured to engage a fore/aft door frame member 80 of the door frame 78. With the door frame engaging surfaces 72 and 74 engaging a fore/aft door frame member 80 and with the rear surface 47 of the alignment tool 30 positioned against the cross-car door frame member 84, the striker pin 82 is set in the appropriate cross-car position for engaging the latch assembly 38. Thus, the cross-car position is defined by the distance between the first and second substantially flat door frame engaging surfaces 72 and 74 and the center of the striker pin through-hole 48. After setting the cross-car position, the alignment tool 30 may then be moved vertically to position the latch fork engaging member 54 for engagement with the latch fork 56 of the latch assembly 38.

It should be appreciated that the specific geometry and shape of the alignment tool 30 may be altered without departing from the scope of the present disclosure. For instance, the first and second substantially flat door frame engaging surfaces 72 and 74 of the first and second cross-car location members 58 and 62 may be connected to define a single end surface. Moreover, rather than an elongated body 40, which is easily graspable by a user, the body 40 may be instead of a generally rectangular shape or another suitable shape. In such an alternative embodiment, the body may include through-holes or recesses for gripping the alignment tool 30.

Referring to FIGS. 6-8, the method for using the alignment tool 30 to properly position a striker pin 82 relative to a latch assembly 38 will now be described in detail. The striker pin 82 may first be disposed within the striker pin through-hole 48 of the alignment tool 30 with the body of the striker pin (not labeled) entering the striker pin through-hole 48 followed by the head (not labeled). In this manner, the striker pin head may be positioned substantially flush within the collar 50 to ultimately set the fore/aft position of the striker pin 82.

With the striker pin 82 received within the striker pin through-hole 48, the alignment tool 30 may be positioned relative to the door frame 78 and the latch assembly 38 to set the cross-car and vertical positions of the striker pin 82. To set the cross-car position, the first and second door frame engaging surfaces 72 and 74 are positioned against the fore/aft door frame member 80 of the door frame 78 while the rear surface 47 engages the cross-car location door frame member 84. The vertical position of the alignment tool 30 may then be adjusted such that the latch-engaging member 54 is engageable with the latch fork 56 of the latch assembly 38. The door 32 is then moved toward the alignment tool 30 until the latch-engaging member 54 is received within the latch fork 56, which sets the vertical location of the striker pin 82 and temporarily secures the door 32 ajar.

With the door frame engaging surfaces 72 and 74 of the first and second cross-car location members 58 and 62 positioned against the fore/aft door frame engaging member 80, and with the latch-engaging member 54 received within the latch fork 56, the body of the striker pin 82 may be disposed within an opening (such as a slot or similar opening(s)) in the cross-car door frame member 84. With the striker pin 82 extending through the opening, the fore/aft position of the striker pin 82 may be set by positioning the striker pin head substantially flush within the annular collar 50.

Once the striker pin position is set, the striker pin 82 may be fixedly secured to the cross-car door frame member 84 in a suitable manner. For instance, a washer having a diameter great than the circumference of the opening in the cross-car door frame member 84 may be disposed on the body of the striker pin 82, and a nut may thereafter be threaded onto the end of the body. The alignment tool 30 may then be removed from the striker pin 82. It should be appreciated that the above-described steps for using the alignment tool 30 to accurately locate a striker pin may be performed in any other suitable order without departing from the scope of the present disclosure.

With the striker pin 82 appropriately positioned on the door frame 78, the striker pin 82 will properly engage and mate with the latch assembly 38, thereby ensuring proper closure of the door 32. Moreover, the gap or seal margin between the door 32 and the door frame 78 will be appropriate for properly sealing the door 32 within the opening 36, substantially preventing any air or water leaks therebetween and leading to a more aesthetically pleasing door installation.

Referring to FIGS. 9-15, an alignment tool 130 formed in accordance with a second embodiment of the present disclosure will now be described. Similar to the alignment tool 30, the alignment tool 130 is configured to position a striker pin in the appropriate vertical, fore/aft, and cross-car location.

Referring specifically to FIGS. 9-12, the alignment tool 130 includes a substantially rectangular body 134 having a front surface 138, a rear surface 140 opposite the front surface, a first end surface 142, a second end surface 144 opposite the first end surface 142, and opposing first and second side surfaces 146 and 148. First and second receptacles 158 and 160 are defined within the front surface 138 of the body 134. The first and second receptacles 158 and 160 extend along the body 134 from a location near the first end surface 142 toward the second end surface 144 and in substantial alignment with the first and second side surfaces 146 and 148, respectively. The first and second receptacles 158 and 160 are sized and configured to allow a user to grip the alignment tool 130 by inserting his/her fingers and thumb therein. In that regard, it should be appreciated that the first and second receptacles 158 and 160 may instead be any suitable size, geometry, and configuration.

A striker pin through-hole 164 is defined in substantially the center of the body 134 between the first and second receptacles 158 and 160. The striker pin through-hole 164 extends substantially transversely between the front and rear surfaces 138 and 140 and is sized to receive a striker pin 82 therein. When the rear surface 140 is positioned against a cross-car door frame member 84 of a door frame 78, the head of the striker pin 82 may be positioned substantially flush with the front surface 138 to set the fore/aft position of the striker pin 82 relative to the door frame 78. An enlarged or flared opening 168 may be defined around the opening of the striker pin through-hole 164 on the rear surface 140 of the body 134 to allow room for securing the striker pin 82 within a portion of the door 32 once its position is set.

With the striker pin 82 received within the striker pin through-hole 164, the first end surface 142 may be engaged with a fore/aft door frame member 80 of a door frame 78 to set the cross-car position of the striker pin 82 on the door frame 78. Thus, the cross-car location of the striker pin 82 is defined by the distance between the end surface 142 and the center of the striker pin through-hole 164. After setting the cross-car location, the alignment tool 130 may then be moved vertically to set the vertical position of the striker pin 82.

A latch-engaging assembly 152 extends from the second end surface 144 to engage a latch assembly 38 on the door 32, which sets the vertical position of the striker pin 82 and temporarily secures the door 32 ajar during installation. The latch-engaging assembly 152 includes a first horn 174 extending substantially transversely from an upper end of the second end surface 144 and a second horn 176 extending substantially transversely from a lower end of the second end surface 144. The first and second horns 174 and 176 are also located at the rear edge of the second end surface 144 and are smaller in thickness compared to the body 134 to allow for clearance of the door 32 during installation.

In that regard, first and second angled surfaces 180 and 182 extend from the first and second horns 174 and 176 to the front surface 138 of the body 134 to provide structural support for the first and second horns 174 and 176 without interfering with the door 32 during use. In addition, an end protrusion 184 extends between the first and second horns 174 and 176 and substantially transversely from the rear edge of the second end surface 144 of the body 134. The end protrusion 184 provides structural support to the first and second horns 174 and 176 extending from the second end surface 144. It should be appreciated that any other suitable support structure may instead be used.

Figure 13:
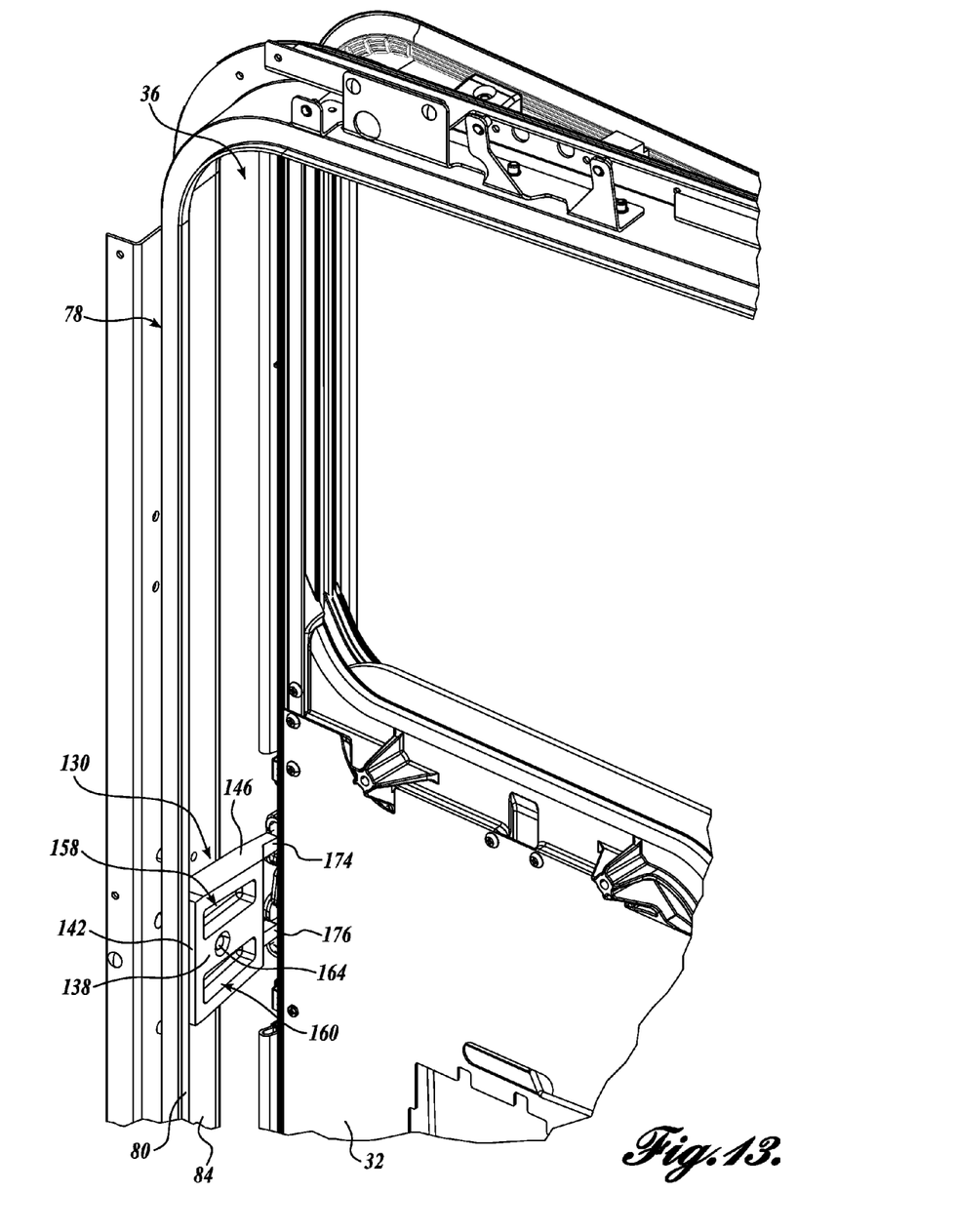
FIG. 13 is a front isometric view of the alignment tool of FIG. 9 shown in use with a door assembly.
Figure 14:
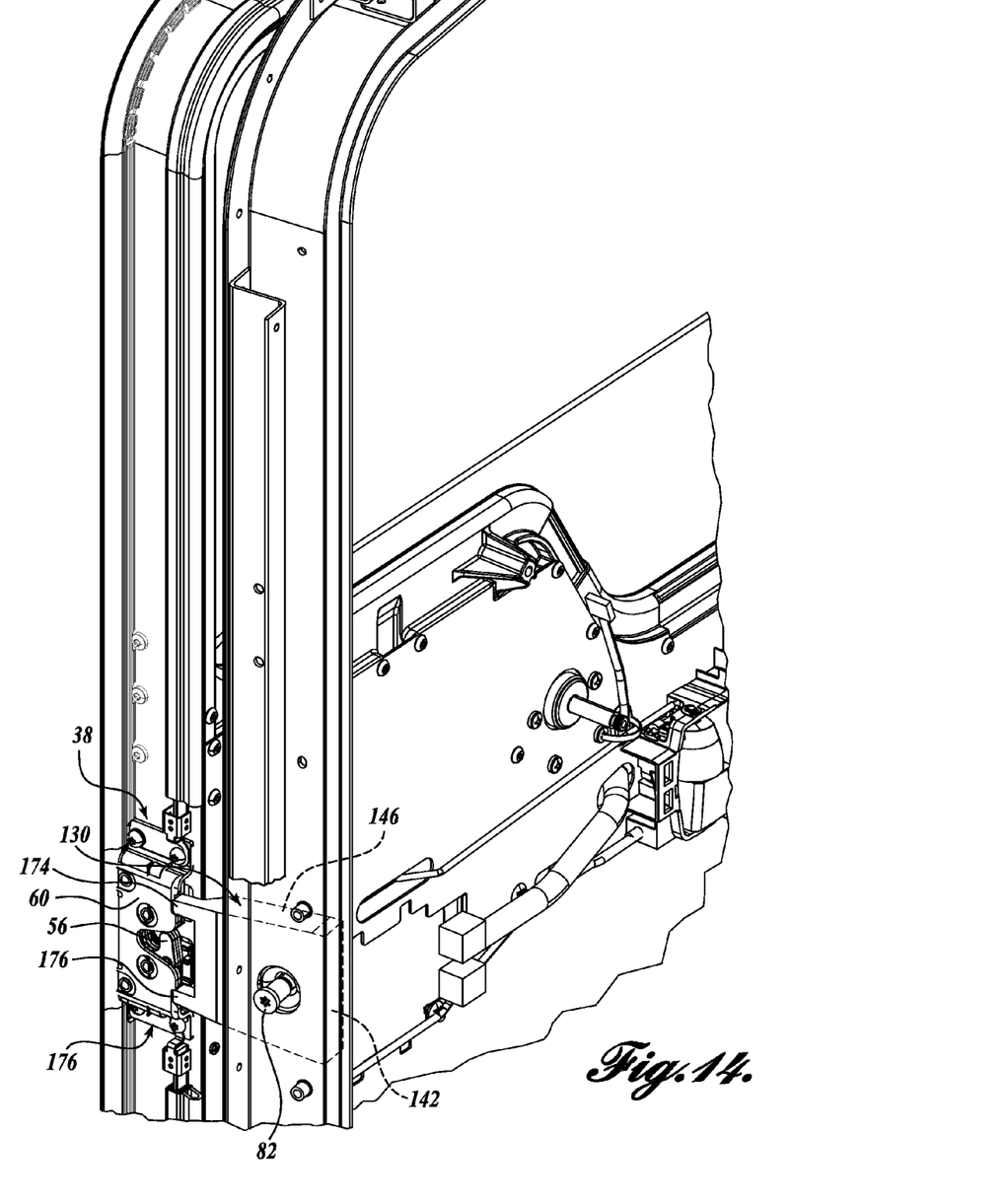
FIG. 14 is a rear isometric view of the alignment tool of FIG. 9 shown in use with a door assembly.
Figure 15:
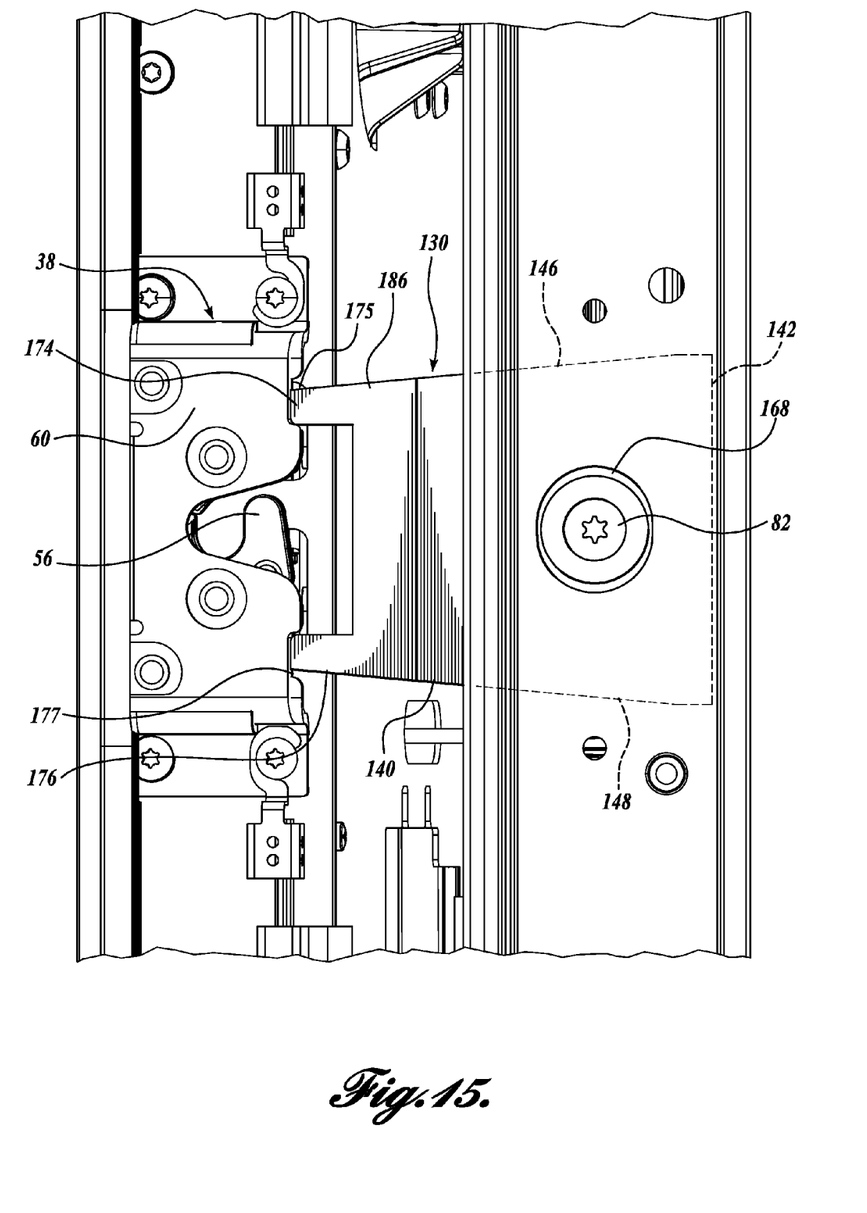
FIG. 15 is a rear plan view of the alignment tool of FIG. 9 shown in use with a door latch assembly of a door assembly.

The first and second horns 174 and 176 are sized and configured to be received within upper and lower notches 175 and 177 defined on an outer edge of the mounting ear bracket assembly 60. With the first and second horns 174 and 176 received within the upper and lower notches 175 and 177, the alignment tool 134 sets the vertical position of the striker pin 82 relative to the latch assembly 38. Fine tune adjustments of the vertical position may be made by imposing a vertical force (such as with a hammer) on one of the first and second side surfaces 146 and 148 of the body 134.

The latch-engaging assembly 152 is also configured to engage the latch assembly 38 and temporarily secure the door 32 ajar during installation of the striker pin 82. In that regard, the alignment tool 130 may be suitably shaped for appropriately engaging the latch assembly without interfering with the door 32 or the door frame 78. The bottom surface 186 of the first and second horns 174 and 176 and the end protrusion 172 extend from the bottom surface 140 of the body 134 at a slight angle in the direction of the body upper surface 138. In this manner, the first and second horns 174 and 176 will not interfere with the door 32 and the horns accurately engage the door 32 in a partially open condition. The first and second angled surfaces 180 and 182 also allow clearance for the door 32 when the first and second horns 174 and 176 are engaging the latch assembly 38. It should be appreciated that the alignment tool 130 may instead include any other suitable shape, geometry, etc., for suitably engaging the latch assembly 38 and holding the door ajar.

Referring to FIGS. 16-19, an alignment tool 230 formed in accordance with a third embodiment of the present disclosure will now be described. Similar to the alignment tools 30 and 130, the alignment tool 230 is configured to position a striker pin in the appropriate vertical, fore/aft, and cross-car location.

Figure 16:
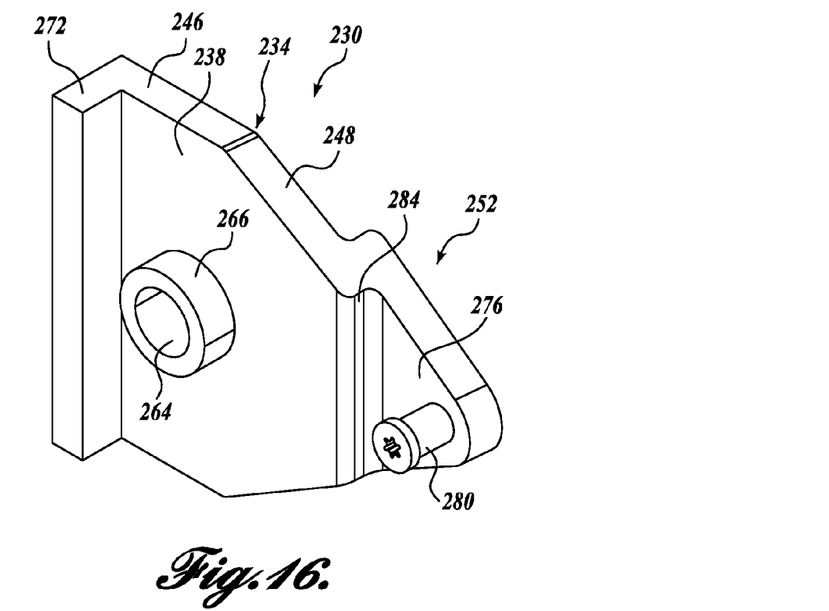
FIG. 16 a front isometric view of an alignment tool formed in accordance with a third embodiment of the present disclosure.
Figure 17:
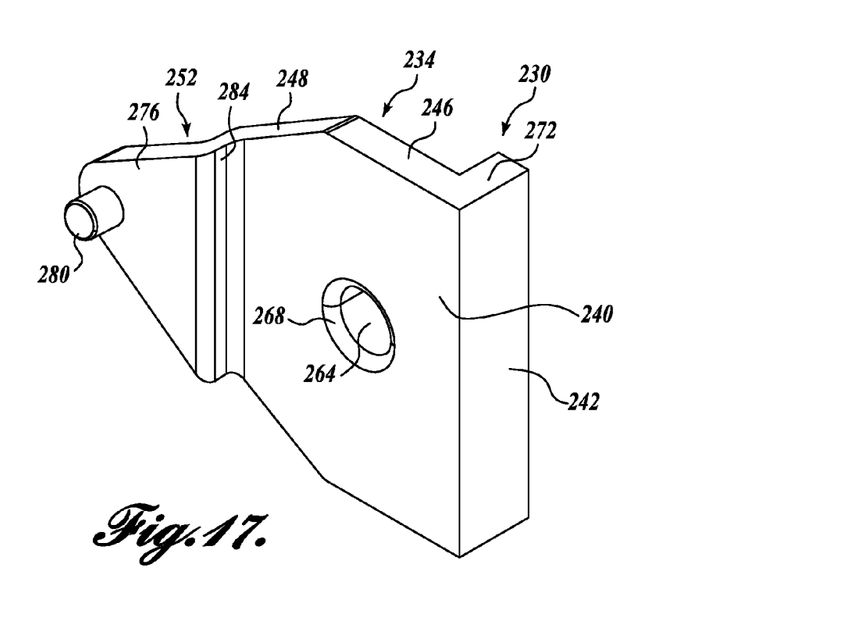
FIG. 17 is a rear isometric view of the alignment tool of FIG. 16 shown in use with a door latch assembly.

Referring specifically to FIGS. 16-17, the alignment tool 230 includes a substantially rectangular body 234 having a front surface 238, a rear surface 240 opposite the front surface, a first end surface 242, and opposing first and second side surfaces 246 and 248. A striker pin through-hole 264 is defined in substantially the center of the body 234, and it extends substantially transversely between the front and rear surfaces 238 and 240. The striker pin through-hole 264 is sized to receive a striker pin 82 therein. Moreover, the striker pin through-hole 264 is surrounded by an annular collar 266 extending substantially transversely from the front surface 238 of the body 234.

When the rear surface 240 is positioned against a cross-car door frame member 84 of a door frame 78, the head of the striker pin 82 may be positioned substantially flush within the annular collar 266 to set the fore/aft position of the striker pin 82 relative to the door frame 78. An enlarged or flared opening 268 may be defined around the opening of the striker pin through-hole 264 on the rear surface 240 of the body 234 to allow room for securing the striker pin 82 within a portion of the door 32 once its position is set.

With the striker pin 82 received within the striker pin through-hole 264, the first end surface 242 may be engaged with a fore/aft door frame member 80 of a door frame 78 to set the cross-car position of the striker pin 82 on the door frame 78. In that regard, an end protrusion 272 may extend transversely from the rear surface 240 of the body 243 to define an end surface 242 having an increased surface area for engaging the fore/aft door frame member 80. The cross-car location of the striker pin 82 is defined by the distance between the end surface 242 and the center of the striker pin through-hole 264. After setting the cross-car location, the alignment tool 230 may then be moved vertically to set the vertical position of the striker pin 82.

A latch-engaging assembly 252 is defined on the alignment tool 230 opposite the end surface 242 that is configured to set the vertical position of the striker pin 82 and temporarily secure the door 32 ajar during installation. The latch-engaging assembly 252 includes a striker pin protrusion 276 that extends laterally from the body 234 away from the end surface 242. A latch-engaging striker pin 280 is secured transversely within the striker pin protrusion 276 and is configured to engage a latch assembly 38 on the door 32. In that regard, the latch-engaging striker pin 280 extends in the fore/aft direction when the first end surface 242 is engaged with a fore/aft door frame member 80 of a door frame 78.

Figure 18:
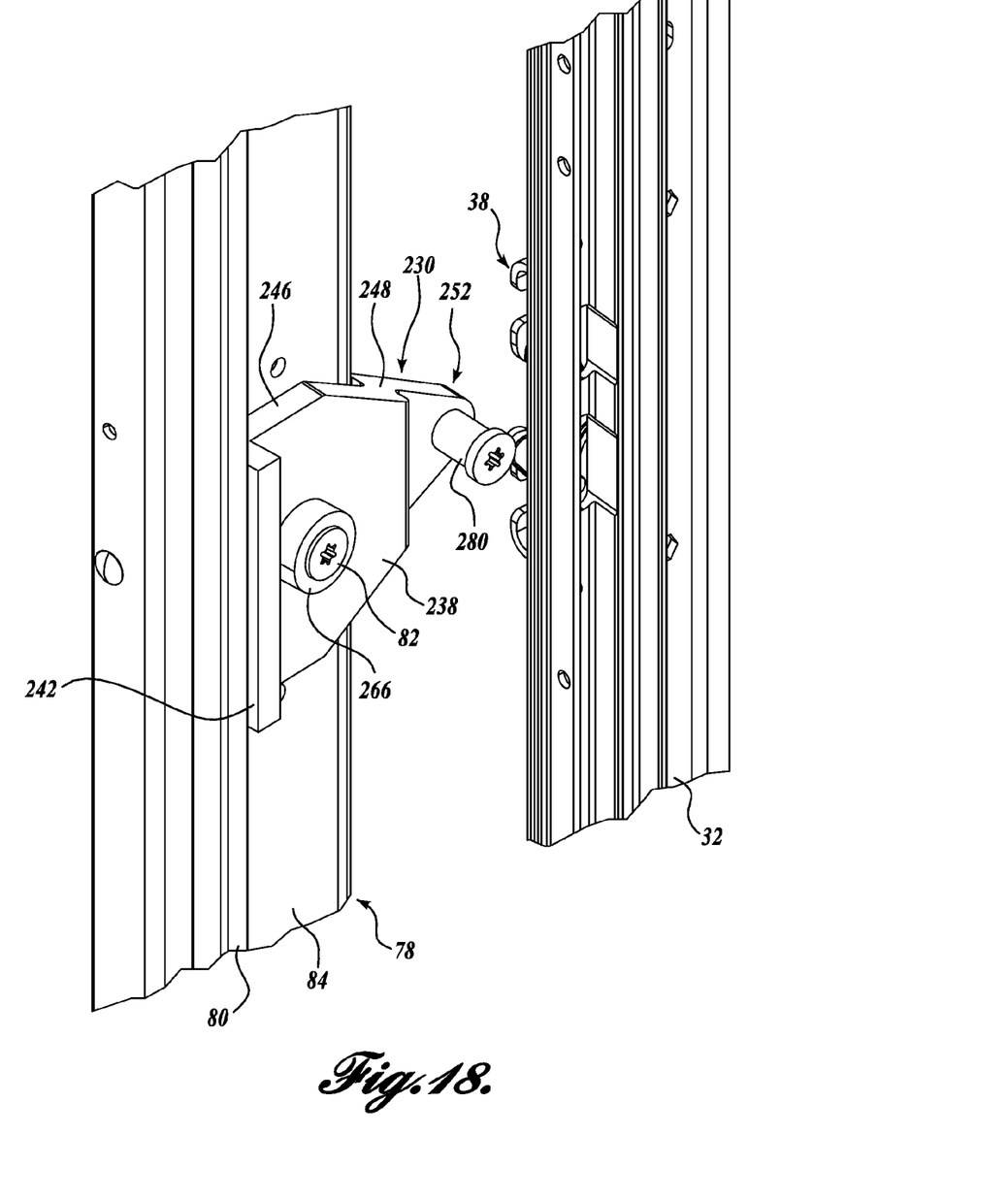
FIG. 18 is a front isometric view of the alignment tool of FIG. 16 shown in use with a door assembly.
Figure 19:
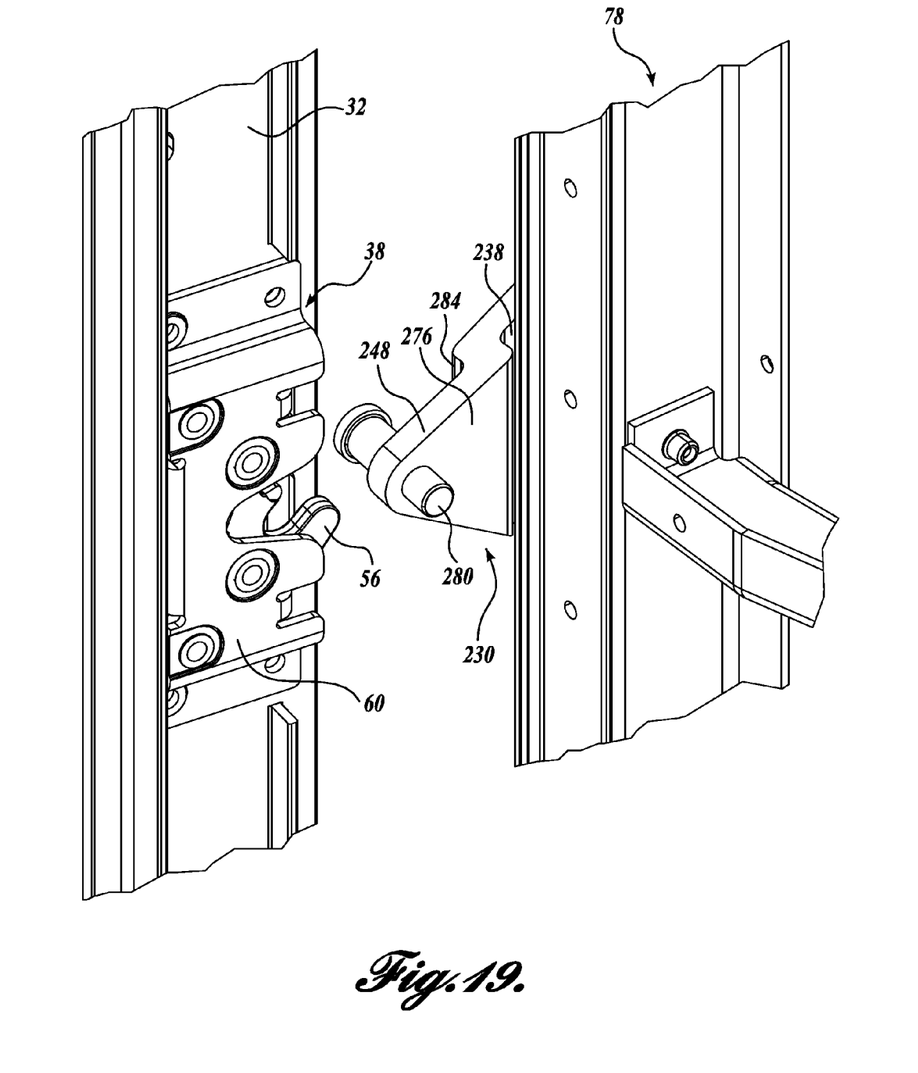
FIG. 19 is rear isometric view of the alignment tool of FIG. 16 shown in use with a door assembly.

The latch-engaging striker pin 280 is substantially identical to the striker pin 82. As such, the latch-engaging striker pin 280 is receivable within the latch fork 56 of the latch assembly 38 to define a latch-fork engaging member. When the latch-engaging striker pin 280 is received within the latch fork 56, the alignment tool 230 sets the vertical position of the striker pin 82 relative to the latch assembly 38. Fine tune adjustments of the vertical position may be made by imposing a vertical force (such as with a hammer) on one of the first side surface 246 or the second side surfaces (not shown) of the body 234.

The latch-engaging assembly 252 is also configured to engage the latch assembly 38 and temporarily secure the door 32 ajar during installation of the striker pin 82. In that regard, the alignment tool 230 may be suitably shaped for appropriately engaging the latch assembly without interfering with the door 32 or the door frame 78. For example, in the depicted embodiment, the striker pin protrusion 276 is offset from the body 234 such that they are not co-planar. Rather, a step 284 extends substantially transversely between the striker pin protrusion 276 and the body 234. The striker pin protrusion 276 may also extend from the step 284 or body 234 at an angle to ensure that the latch-engaging striker pin 280 is appropriately received within the latch fork 56. Moreover, the striker pin protrusion 276 is also sufficiently angled to allow clearance for the door 32 when the latch-engaging striker pin 280 engages the latch assembly 38. It should be appreciated that the alignment tool 230 may instead include any other suitable shape, geometry, etc., for suitably engaging the latch assembly 38 and holding the door ajar.

While illustrative embodiments have been illustrated and described, it will be appreciated that various changes can be made therein without departing from the spirit and scope of the invention.

The embodiments of the invention in which an exclusive property or privilege is claimed are defined as follows:

1. An alignment tool for use with a vehicle having a door moveably secured to a door frame and a door latch assembly defined on the door, the door latch assembly configured to removably receive a striker pin of the vehicle having a body and a head, the alignment tool comprising:
   (a) a body having a front surface and a rear surface, wherein the rear surface of the body is engageable with a cross-car door frame member to set a fore/aft position of the striker pin;
   (b) a through-hole extending through the body that is substantially the same circumference as an outer circumference of a head of a striker pin of a vehicle;
   (c) an annular collar surrounding the through-hole and extending from the front surface of the body, wherein the annular collar has an inner circumference that is substantially the same circumference as the outer circumference of the head of a striker pin, wherein the head of the striker pin is substantially flush within the annular collar when the rear surface is engaged with the cross-car door frame member;
   (d) a first end surface defined on the body that is configured to engage a fore/aft door frame member to set a cross-car position of the striker pin; and
   (e) a latch-engaging assembly engageable with a portion of the door latch assembly to set a vertical position of the striker pin.

2. The alignment tool of claim 1, wherein the end surface of the body is defined by first and second door frame engaging surfaces.

3. The alignment tool of claim 1, wherein the first and second door frame engaging surfaces are defined on ends of first and second cross-car location members extending from the body.

4. The alignment tool of claim 1, wherein the first end surface of the body is defined by an end protrusion extending substantially transversely from the body.

5. The alignment tool of claim 1, wherein the latch-engaging assembly comprises a latch-fork engaging member engageable with a latch fork of the door latch assembly.

6. The alignment tool of claim 5, wherein the latch-fork engaging member is a latch engaging striker pin.

7. The alignment tool of claim 1, wherein the latch-engaging assembly comprises first and second horns extending from a second end surface of the body, the first and second horns receivable within first and second notches on the door latch assembly.

8. The alignment tool of claim 1, further comprising first and second receptacles defined in the front surface of the body.

9. The alignment tool of claim 1, wherein the body includes a first cross-car location member defined at a first end of the body, a second cross-car location member defined at a second end of the body, and a striker pin protrusion defined between the first and second cross-car location members, wherein the rear surface of the body is defined by a rear surface of the first cross-car location member, a rear surface of the second cross-car location member, and a rear surface of the striker pin protrusion, and wherein the rear surfaces of the first cross-car location member, the second cross-car location member, and the striker pin protrusion are co-planar.

10. The alignment tool of claim 5, wherein the latch-fork engaging member defines a longitudinal axis that is in substantial alignment with a center of the through-hole.

11. An alignment tool for use with a vehicle having a door moveably secured to a door frame and a door latch assembly defined on the door, the alignment tool comprising:
   (a) a body having a front surface and a rear surface, wherein the body includes a first cross-car location member defined at a first end of the body, a second cross-car location member defined at a second end of the body, and a striker pin protrusion defined between the first and second cross-car location members, wherein the rear surface of the body is defined by a rear surface of the first cross-car location member, a rear surface of the second cross-car location member, and a rear surface of the striker pin protrusion, and wherein the rear surfaces of the first cross-car location member, the second cross-car location member, and the striker pin protrusion are co-planar, and wherein the rear surface of the body is engageable with a cross-car door frame member to set a fore/aft position of the striker pin;

(b) a through-hole extending through the body that is sized and configured to receive a striker pin of a vehicle;

(c) a first end surface defined on the first cross-car location member and a second end surface defined on the second cross-car location member, the first and second end surfaces substantially co-planar and configured to engage a fore/aft door frame member to set a cross-car position of the striker pin; and (d) a latch-engaging assembly engageable with a portion of the door latch assembly to set a vertical position of the striker pin.

12. The alignment tool of claim 11, wherein the latch-engaging assembly comprises a latch-fork engaging member engageable with a latch fork of the door latch assembly.

13. The alignment tool of claim 12, wherein the latch-fork engaging member is a latch engaging striker pin.

14. The alignment tool of claim 11, wherein the latch-engaging assembly comprises first and second horns extending from a second end surface of the body, the first and second horns receivable within first and second notches on the door latch assembly.

15. The alignment tool of claim 11, further comprising first and second receptacles defined in the front surface of the body.

16. An alignment tool for use with a vehicle having a door moveably secured to a door frame and a door latch assembly defined on the door, the alignment tool comprising:

(a) a body having a front surface and a rear surface, wherein the rear surface of the body is engageable with a cross-car door frame member to set a fore/aft position of the striker pin;

(b) a through-hole extending through the body that is sized and configured to receive a striker pin of a vehicle;

(c) a first end surface defined on the body that is configured to engage a fore/aft door frame member to set a cross-car position of the striker pin; and (d) a latch-engaging assembly engageable with a portion of the door latch assembly to set a vertical position of the striker pin, wherein the latch-engaging assembly comprises a latch-fork engaging member engageable with a latch fork of the door latch assembly, the latch-fork engaging member defining a longitudinal axis that is in substantial alignment with a center of the through-hole.

17. The alignment tool of claim 16, wherein the end surface of the body is defined by first and second door frame engaging surfaces.

18. The alignment tool of claim 16, wherein the first and second door frame engaging surfaces are defined on ends of first and second cross-car location members extending from the body.

19. The alignment tool of claim 16, wherein the first end surface of the body is defined by an end protrusion extending substantially transversely from the body.

* * * * *